(12) United States Patent
Martin (10) Patent No.: US 7,222,323 B2
(45) Date of Patent: May 22, 2007

(54) EVOLUTIONARY PROGRAMMING OF CONFIGURABLE LOGIC DEVICES

(75) Inventor: Peter Nigel Martin, Dorset (GB)

(73) Assignee: Ericsson AB, Stockholm (SE)

( * ) Notice: Subject to any disclaimer, the term of this patent is extended or adjusted under 35 U.S.C. 154(b) by 231 days.

(21) Appl. No.: 10/469,808

(22) PCT Filed: Feb. 7, 2002

(86) PCT No.: PCT/GB02/00517

§ 371 (c)(1),
(2), (4) Date: Sep. 23, 2004

(87) PCT Pub. No.: WO02/071209

PCT Pub. Date: Sep. 12, 2002

(65) Prior Publication Data

US 2005/0038761 A1   Feb. 17, 2005

(30) Foreign Application Priority Data

Mar. 3, 2001   (GB) .................................. 0105357.8

(51) Int. Cl.
*G06F 17/50*   (2006.01)
*G06F 15/18*   (2006.01)
*G06N 3/12*   (2006.01)

(52) U.S. Cl. ........................................ 716/16; 706/13
(58) Field of Classification Search ............ 716/16–17; 706/1, 13
See application file for complete search history.

(56) References Cited

U.S. PATENT DOCUMENTS

| 5,897,628 A | * | 4/1999 | Kitano ........................ 706/13 |
| 5,926,803 A | | 7/1999 | Kitano |
| 5,970,487 A | * | 10/1999 | Shackleford et al. .......... 707/6 |
| 6,185,547 B1 | * | 2/2001 | Shackleford et al. ......... 706/13 |
| 6,430,736 B1 | * | 8/2002 | Levi et al. .................... 716/17 |
| 6,526,556 B1 | * | 2/2003 | Stoica et al. .................. 716/16 |
| 6,539,532 B1 | * | 3/2003 | Levi et al. .................... 716/16 |

FOREIGN PATENT DOCUMENTS

| EP | 0 657 832 A2 | 6/1995 |
| EP | 0 762 294 A2 | 3/1997 |
| WO | WO 00/51077 | 8/2000 |

OTHER PUBLICATIONS

*Fault-Tolerant Evolvable Hardware Using Field-Programmable Transistor Arrays*, D. Keymeulen, et al., IEEE Transactions on Reliabilty, vol. 40, No. 3, pp. 305-316, Sep. 2000, ISSN: 0018-9529.

(Continued)

*Primary Examiner*—Stacy A Whitmore
(74) *Attorney, Agent, or Firm*—Kirschtein, et al.

(57) ABSTRACT

A configurable hardware logic device is configured to implement a complete evolutionary algorithm in hardware. The configured hardware logic device produces an initial population of individuals, carries out fitness tests on the initial population of individuals, selects an individual or individuals of the initial population on the basis of results of the fitness tests, breeds a further population of individuals from the selected individual or individuals, and provides a single preferred selected individual from the further population of individuals.

24 Claims, 7 Drawing Sheets

OTHER PUBLICATIONS

*Software to Silicon*, I. Page, et al., IEEE Review, vol. 46, No. 5, pp. 15-19, Sep. 2000, ISSN: 0013-5127.

*An Applications Approach to Evolvable Hardware*, R. Porter, et al., Evolvable Hardware, 1999, Proc. 1st NASA/DoD Workshop, Jul. 19-21, 1999, pp. 170-174, ISBN: 0-7695-0256-3.

*Optimisation Techniques Based on the Use of Genetic Algorithms ( Gas) for Logic Immplementation on FPGAs*, P. Thomsom, et al., IEEE Colliquium on Software Support and CAD Techniques for FPGAs, 1994, pp. 4/1-4/4.

*Evolving Sorting Networks Using Genetic Programming and the Rapidly Configurable Xilinx 6216 Field-Programmable Gate Array.* J. R. Koza, et al., Signals, Systems & Computers 1997, Conference Record, vol. 1, pp. 404-410, ISBN: 0-8186-8316-3.

*Hardware Compilation for Software Engineers: An ATM Example*, IEEE Proceedings: Software, IEEE, Stevengage, GB, vol. 148, No. 1, Feb. 26, 2001, pp. 31-42.

*Implementation of Genetic Algorithm Based on Hardware Optimization*, Tencon 99, Proceedings of the IEEE 1998 Region 10 Conference Cheju Island, South Korea, Sep. 15-17, 1999, Piscataway, NJ, USA, Sep. 15, 1999, pp. 1490-1493.

*Gas: A VLSI Genetic Algorithm Accelerator With On-The_Fly Adaptation of Crossover Operators*, Circuits and Systems, 1998, ISCAS '98, Proceedings of the 1998 IEEE International Symposium on Monterey, CA, USA, May 31-Jun. 3, 1998, New York, NY. USA, IEEE, May 31, 1998, pp. 268-271.

\* cited by examiner

EVOLUTIONARY PROGRAMMING OF CONFIGURABLE LOGIC DEVICES

Genetic Programming (GP) systems are generally realized as programs running on general purpose computers. This work was motivated by the observation that as problems get harder, the performance of traditional computers can be severely stretched. This is despite the continuing increase in performance of modern CPUs, and the use of multiple processors to exploit the fact that GP can be parallelised. By implementing a GP system directly in hardware the aim is to increase the performance by a sufficiently large factor so as to make it possible to tackle harder problems.

The present invention shows how a GP system can be implemented in hardware using a hardware compilation technique. Initially there is a description of the hardware and the hardware compilation language. This is followed by a description of the GP system in general and a discussion of the design decisions that had to be made in order to successfully fit a GP system into a Field Programmable Gate Array (FPGA). This is followed by some example problems chosen to exercise the implementation. The results of running the system and comparisons with a traditional implementation follow.

The following section briefly describes FPGAs in general. This is followed by a description of the high level language to hardware compilation system. This is not intended to be a full description of the tool, but it describes the most important features, especially those that influence the design decisions described later.

This introduction is intended to make some of the following discussions easier to understand for those with little or no experience of FPGAs. More comprehensive data can be located at various manufacturers web sites.

Figure 1:
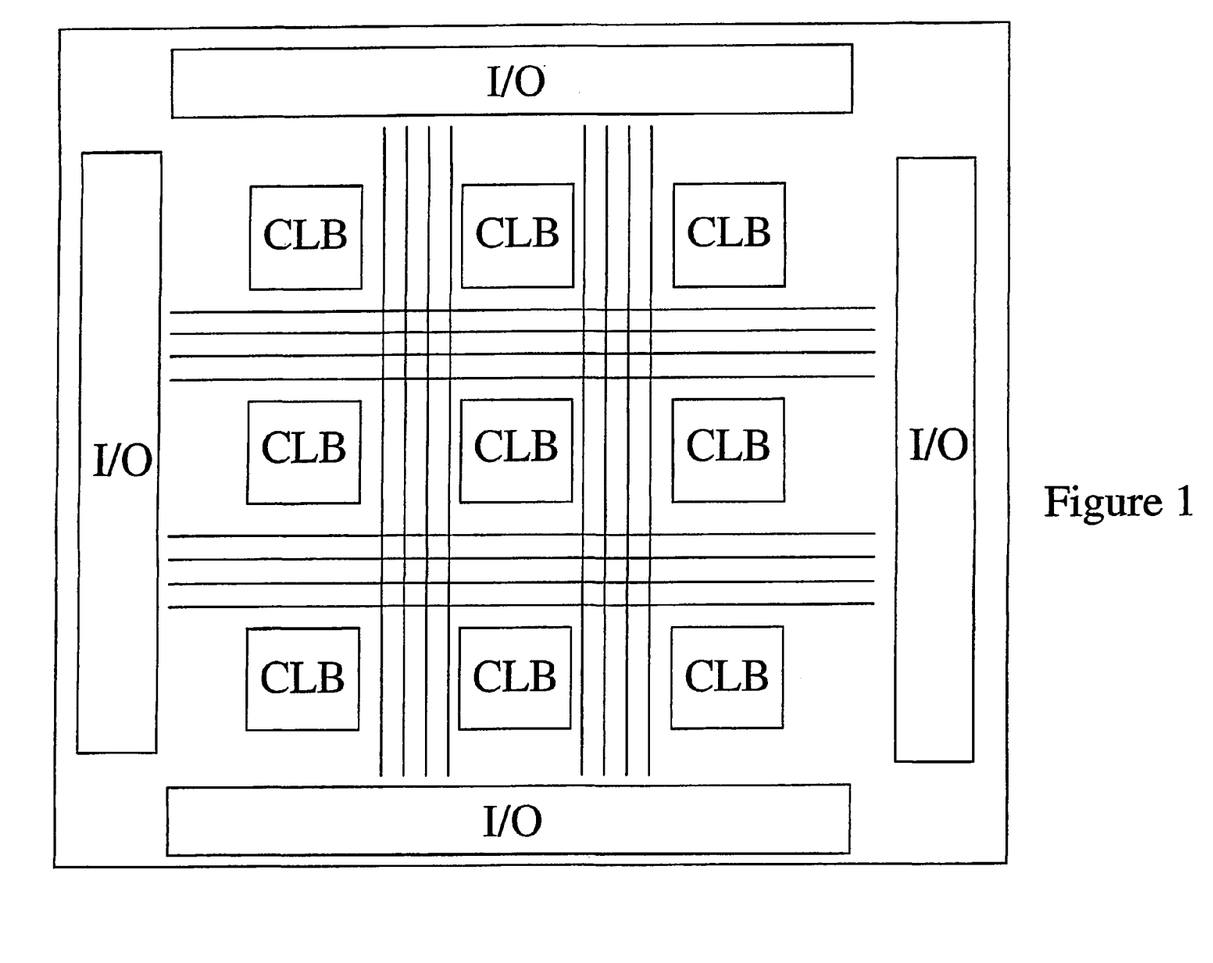

FPGAs are a class of programmable hardware devices, consisting of an array of Configurable Logic Blocks (CLBs) and configurable interconnects. A general model of an FPGA is shown in FIG. 1.

Figure 2:
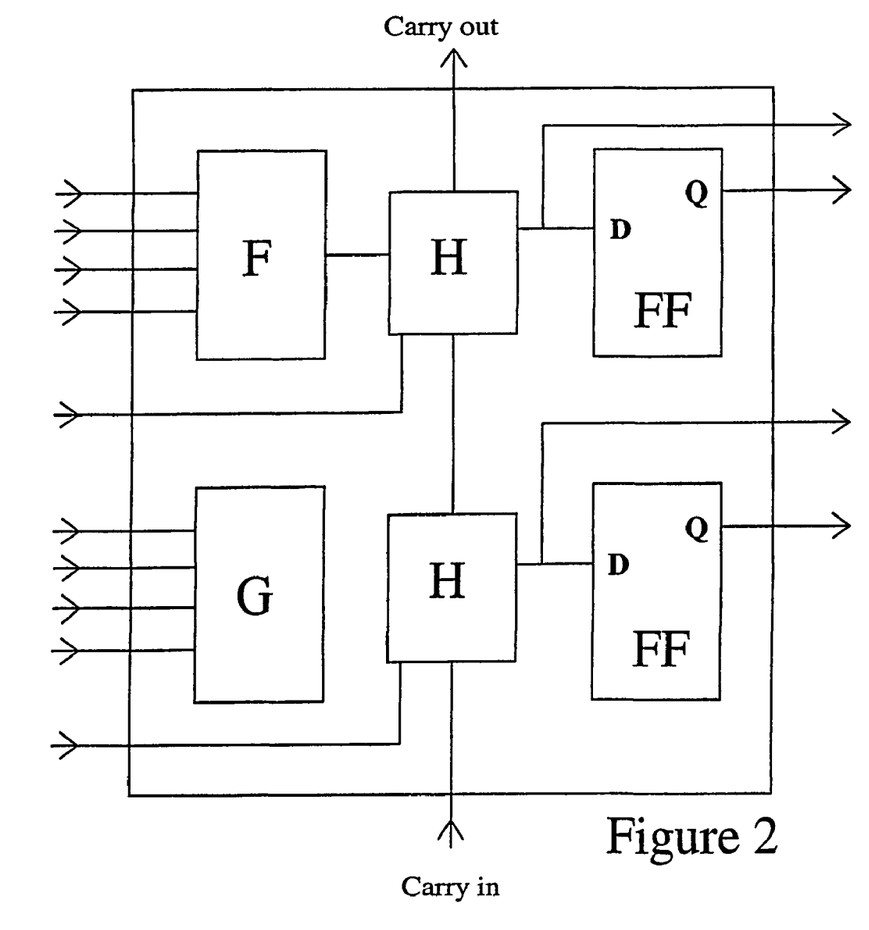

Each CLB consists of two function generators (F & G) and two flip-flops (FF). Internal Carry and Control logic (H) connects the function generators and the flip-flops. A general model of a CLB is shown in FIG. 2.

The configuration of these devices is achieved by loading configuration bit patterns. In the Xlinx XCV4000 FPGA, which is the example device used herein, the bit patterns are programmed into static RAM on the chip. This has to be done each time the chip is re-powered. The configuration bit patterns are generated using software tools that take a high level description of the configuration information.

Handel-C is a high-level language to hardware translation system, designed to compile programs written in a C-like language into synchronous hardware. The output from Handel-C is a file that can be used to create the configuration data for a FPGA. Handel-C is produced by Celoxica [www.celoxica.com].

Handel-C has a C-like syntax. This makes the tool appealing for software engineers with no experience of hardware, in that they can quickly translate a software algorithm into hardware, without having to learn about FPGAs in detail, or VHDL. VHDL is a standard hardware design language. It stands for VHSIC Hardware Design Language. VHSIC itself stands for Very High Speed Integrated Circuit.

One of the advantages of using hardware is the ability to exploit parallelism directly. This is in contrast to the simulated software parallelism that is found on single CPU computers achieved using time-slicing. Handel-C has additional constructs to support the parallelisation of code.

```
The block
par{
    a=10;
    b=20;
}
``` would generate hardware to assign the value 10 to a and 20 to b in a single clock cycle. Using arrays of functions or by generating inline code, large blocks of functionality can be generated that execute in parallel.

Hardware can be replicated using the construct

```
par (i=0;i<10;i++) {
    a[i] = b[i];
}
``` which would result in 10 parallel assignment operations.

To make efficient use of the hardware, Handel-C requires the programmer to declare the width of all data, for example,

```
int 5 count;
``` is a signed integer that is 5 bits wide, and so will be able to represent the values between −15 and +15.

Handel-C supports a single Integer data type.

Communication between the hardware and the outside world is performed using interfaces. These may be specified as input or output, and as with assignment a write to or a read from an interface will take one clock cycle. The language allows the designer to target particular hardware, assign input and output pins, specify the timing of signals, and generally control the low level hardware interfacing details. Macros are available to help target particular devices.

According to the Handel-C documentation, the simple rule about timing of statements is that "assignment takes 1 clock cycle, the rest is free". This means that expressions are constructed using combinatorial logic, and data is clocked only when an assignment is performed. For example, Handel-C would generate hardware for the following statement that executed in a single clock cycle.

$y=((x*x)+3*x);$

This feature makes it easy to predict the performance in terms of clock cycles. However, there is a penalty in that the more complex the expression, the deeper the logic required to implement the expression. This in turn limits the maximum clock rate at which the design can be run because of the propagation delays associated with deep logic. In practice this means that the designer needs to trade clock cycles against clock rate, and this is typically an iterative process.

Because Handel-C targets hardware, there are some programming restrictions when compared to a traditional ANSI-C compiler. These need to be taken into consideration when designing code that can be compiled by Handel-C. Some of these restrictions particularly affect the building of a GP system.

Firstly, there is no stack available, so recursive functions cannot be directly supported by the language. This in turn means that standard GP, which relies heavily on recursion, cannot be implemented without some modification. Secondly, there is a limit on the size of memory that can be implemented using standard logic cells on an FPGA, because implementing memory is expensive in terms of silicon real estate. However, some FPGAs have internal ram that can be used by Handel-C. For example the Xlinx Virtex and Spartan series support internal memory that Handel-C allows the user to declare as RAM or ROM. For example the definition ram int 8 mem[128];

declares a RAM block of 128 cells, each 8 bits wide, which can be accessed as a normal array.

A limitation of using RAM or ROM is that it cannot be accessed more than once per clock cycle, so restricting the potential for parallel execution of code that accesses it.

Figure 3:
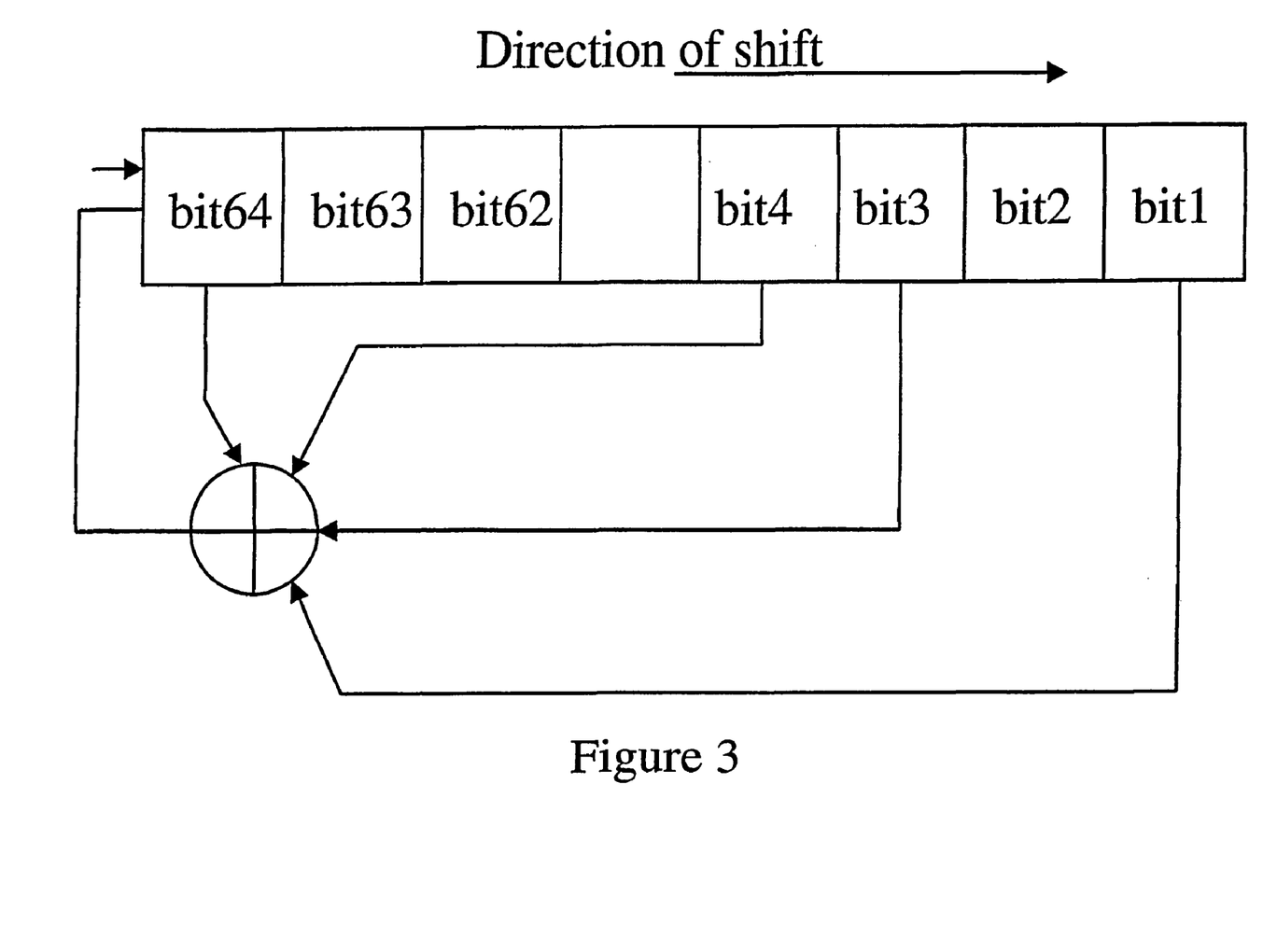

Thirdly, expressions are not allowed to have side effects, since this would break the single cycle assignment rule. Therefore code such as a=++b;

is not allowed and needs to be re-written as:

b=b+1;

a=b;

Handel-C supports two targets. The first is a simulator target that allows development and testing of code without the need to use any hardware. This is supported by a debugger and other tools. The second target is the synthesis of a netlist to input to place and route tools. A netlist is a formal description of the gates and their connections. Place and route is the process of translating a netlist into a hardware layout. This allows the design to be translated into configuration data for particular chips. An overview of the process is shown in FIG. 3. Analysis of cycle count is available from the simulator, and an estimate of gate count is generated by the Handel-C compiler. To get definitive timing information and actual hardware usage, the place and route tools need to be invoked.

FPGAs have been used to implement parts of a GP system. The system described in "Register-based Genetic Programming on FPGA computing platforms" (M I Heywood and A N Zincir-Heywood; Genetic Programming, Proceedings of Euro GP 2000 Volume 1802 of LNCS, pages 44–59, Edinburgh 15–16 Apr. 2000; Springer-Verlag) was simulated using more traditional FPGA tools. The proposal in his work was to use the FPGA only for evaluating the individuals and performing mutation and crossover.

Koza et al used an FPGA to speed up the evaluation of fitness of a sorting network "Evolving sorting networks using genetic programming and the rapidly configurable Xilinx 6216 field-programmable gate array" (John R Koza et al; Proceedings of the 31st Asilomar Conference on Signals, Systems and Computers; IEEE Press, 1997). In this work the FPGA was used solely to perform the fitness evaluation. The initial population was created by a host computer, and then individuals were downloaded to the FPGA and the FPGA instructed to evaluate the fitness of the individual. Subsequent selection and breeding were again performed by the host computer.

The next section describes the general design decisions taken to implement GP in hardware.

The aim was to realise a complete GP system in hardware. That is initial population generation, fitness evaluation, breeding and the delivery of the final result. This is in contrast to all other examples of using FPGAs with Genetic Programming. This high level aim guided many of the following design decisions.

The lack of a built-in stack when using Handel-C makes the use of recursive functions difficult. Although there are well known methods of removing recursion from algorithms, a stack of some form is still required to store intermediate results. An alternative to the standard tree representation is the linear GP system. The details of the internal representation depend on the word size, number of functions, and number of terminals used, and these are dependent on the problem being tackled. For the present work, a register like machine was chosen for its simplicity. A general layout of an instruction is shown in table 1. Each program is an array of instructions together with some control information. To simplify the manipulation of programs, each program is a fixed maximum size, with a maximum active length stored against it. The representation of a program is shown in table 2.

TABLE 1

General layout of an instruction

| Field | Comments |
| --- | --- |
| Opcode | The operation being encoded. |
| Effective Address 1 | The primary source operand and the destination address. Always a register. |
| Effective Address 2 | The secondary operand. Can be a register, a new Program counter or an index into a table of constants. |

TABLE 2

General layout of an individual

| Field | Comments |
| --- | --- |
| Length | The active length of the program. |
| Raw fitness | The raw fitness of the program |
| Instructions | An array of instructions |

According to the present invention there is provided an uncommitted configurable hardware logic device when configured to implement a complete evolutionary algorithm in hardware, the configured hardware logic device comprising;
(a) population producing means having an output and arranged to produce an initial population of individuals at the output;
(b) fitness evaluating means having an input and first and second outputs, the output of the population producing means being connected to the input of the fitness evaluating means and the fitness evaluating means being arranged to carry out fitness tests on the initial population of individuals and to provide the results of the fitness tests and the respective individuals at the first output of the fitness evaluating means;
(c) selector means having an input and an output and arranged to select an individual or individuals of the initial population on the basis of results of the fitness tests and the respective individuals connected from the output of the fitness evaluating means to the input of the selector means and to provide the selected individual or individuals at the output of the selector means;
(d) breeding means having an input connected to the output of the selector means and arranged to breed a further population of individuals from the selected individual or individuals and having an output connecting the further population of individuals to the input of the fitness evaluating means;

the fitness evaluating means being further arranged to provide a single preferred selected individual from the further population of individuals at the second output thereof.

There is further provided a method of implementing a complete evolutionary algorithm in hardware comprising configuring an uncommitted configurable hardware logic device so as to carry out the steps of;

(e) creating an initial population of individuals;
(f) evaluating the fitness of the initial population of individuals;
(g) selecting one or more individuals from the initial population thereof;
(h) breeding a further population of individuals from the selected one or more individuals;
(i) evaluating the fitness of the further population of individuals;
(j) selecting a preferred one of the further population of individuals based on the fitness of the further population of individuals.

Figure 4:
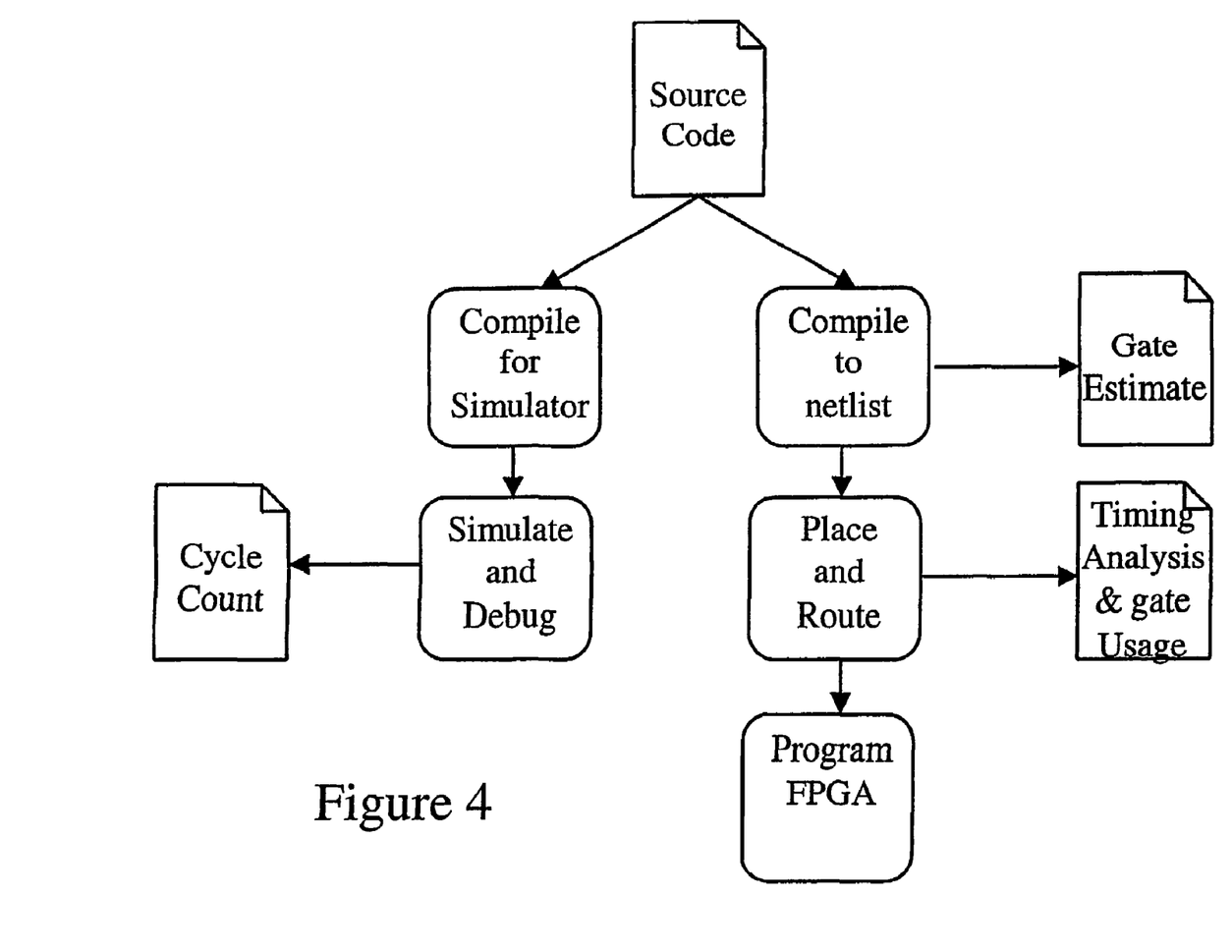
Figure 5:
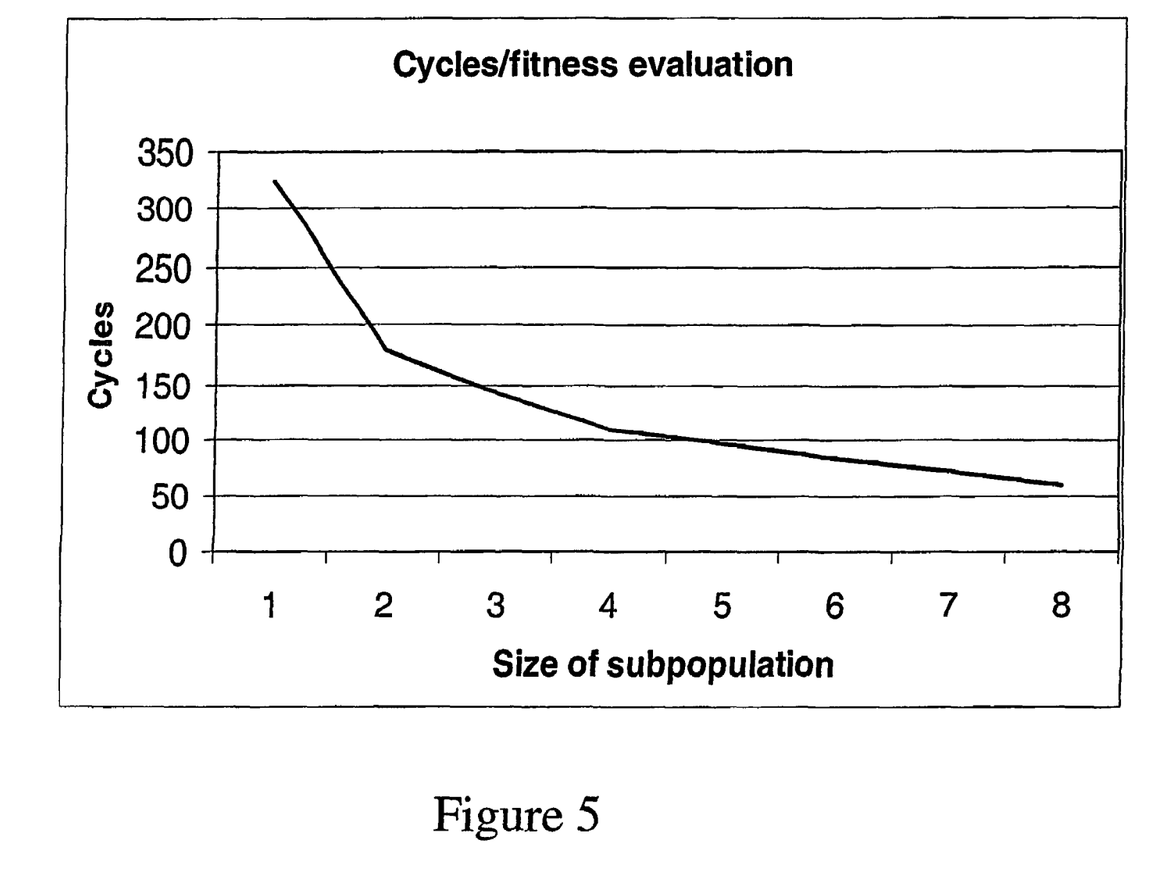
Figure 6:
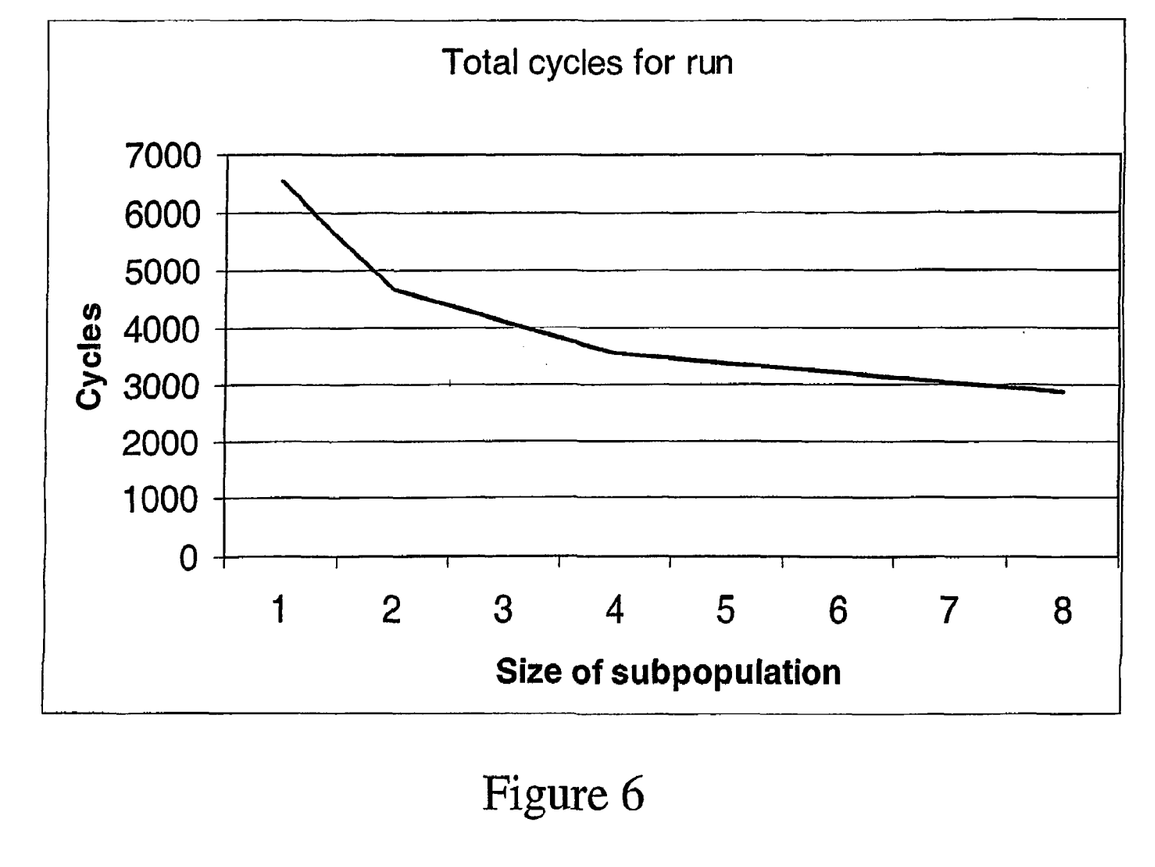

The present invention will now be described by way of example, with reference to the accompanying drawings, in which:

FIG. 1 shows a general model of an FGPA;

FIG. 2 shows general model of a CLB;

FIG. 3 shows an overview of the process of translating code into hardware;

FIG. 4 shows a diagram of a Linear Feedback Shift Register Random Number Generator;

FIG. 5 illustrates the number of cycles to carry out one fitness function evaluation for the population;

FIG. 6 illustrates the total number of cycles for the problem; and

Figure 7:
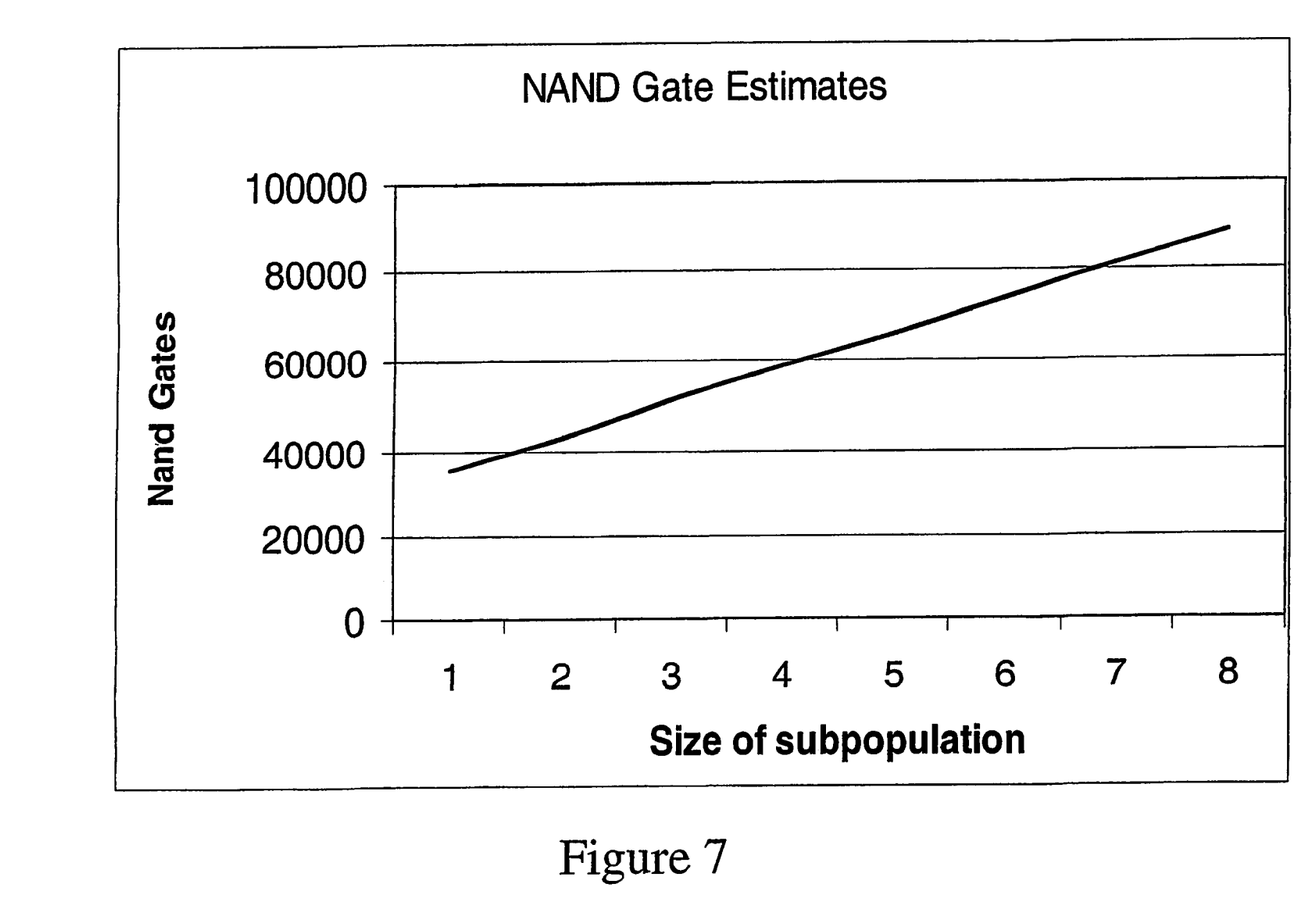

FIG. 7 illustrates an estimated NAND gate count as the number of parallel fitness evaluations is increased.

A key difference between the present work and others, is that it is not constrained to a function set that a microprocessor designer sees fit to implement. That is to say the functions can be designed to have a higher level of abstraction than machine instructions. An example of a problem where the function set is expressed at a high level of abstraction is the function and terminal set require several steps to be performed. If implemented using a RISC or CISC architecture, each step would require several RISC instructions to be executed. With Handel-C the functions could be encoded efficiently and compactly.

One of the key advantages of hardware is that it is possible to design truly parallel machines. In order to make the most efficient use of the available silicon, choosing which parts to make parallel needs some care. The three main phases of GP are the initial population creation, the fitness evaluation of all individuals, and the breeding of new generations. Since the first is only performed once, there is little advantage in consuming excessive silicon resources to speed this phase up. The evaluation of fitness is traditionally cited as the most expensive in terms of processing resources, so this is a prime candidate for making a parallel phase. The breeding phase normally accounts for significantly less than the fitness evaluation, so there may be some advantage in making this parallel only in critical sections.

The design used in this work exploits parallel execution of all simple statements where possible. This is done regardless of the phase of GP since there is no penalty in executing two assignments in parallel; the hardware will be generated for each assignment anyway. This is especially useful when initialising variables at the beginning of a function.

The fitness evaluation phase exploits the parallel capabilities by executing a number of evaluations at the same time. If the problem has a total population size of P then a subpopulation of size S=P/n individuals are evaluated in parallel. To make this as efficient as possible, and to make the maximum use of the hardware, all parameter settings are powers of 2. So if P=16 and n=4 then S=4. Parallelisation of the evaluation is implemented by using the inline keyword in Handel-C. This causes as many copies of the hardware to be generated as required.

A random number generator (RNG) is used in two of the major steps in GP. Firstly, during initial population creation, and secondly, during the breeding phase. When using Handel-C, the use of the standard multiply and divide instructions are inefficient in terms of silicon because of the deep logic generated. Because of this the usual linear congruential generators normally found were rejected. Instead, a linear feedback shift register (LFSR) design was used. A word size of 64 was chosen, as this could be implemented efficiently on a standard modern CPU, and so the LFSR can be ported easily to ANSI-C. It is important to choose a good polynomial to make sure that the RNG can generate a maximal sequence of 2n−1 random numbers, while keeping the number of taps to a minimum for efficiency. For a 64 bit word the polynomial $x_{64}+x_4+x_3+x_2+x_1+x_0$ was used (FIG. 4 shows 4 terms from a polynomial; 5 terms from a 64 bit word; $x_0$ is always 1 and so is ignored). The block diagram of the LFSR is shown in FIG. 4.

The RNG is designed so that a random number is generated in one cycle. The required number of bits are then read from the 64 bit register, starting at bit 1 to give a random number. For example if the system has 8 instructions, then 3 bits are needed to encode the instruction. During initial program creation the random selection of an instruction uses the bottom 3 bits. Handel-C allows efficient bit operations, and the code to select the 3 bits is:

unsigned int 3 instruction;

instruction=randReg[2:0];

where randReg is the shift register variable.

Seeding of the RNG is done by reading a 64 bit port during the initialisation phase. This allows the RNG to be seeded from an external source, such as a time of day clock, or other source of noise. It also allows the RNG to be preset to a known seed for reproducing particular results.

A limitation of the current implementation of the generator is that it is not possible to allow parallel execution blocks to generate a random number because this would violate a condition of Handel-C that says a single instance of a function may not be called from a parallel block. This means that the initial program generation and breeding phases cannot be parallelised. While this can be overcome by implementing multiple generators, it was thought more important to dedicate resources to the fitness evaluation phase.

To conserve memory, a steady state breeding policy is used. For a population size of P, every generation P individuals are selected at random and an operator applied to that individual. If the operator is crossover or copy, then this is counted as two individuals having been processed. Tournament selection is used with a tournament size of two. Larger tournament selection makes little sense with very small populations.

The operators were selected using the following probabilities. Mutation 10%, Crossover 70%, copy 20%.

The mutation operator works by reusing the function that generates a program node during initial program creation. This is done primarily to economise on hardware. The result is that a mutation can change zero, one or more of the instruction details.

Crossover for a linear program representation causes some problems in that it is generally wanted to avoid performing large block memory moves. The present work maintains a fixed maximum program size, and copies segments from one program to another. By exploiting the parallel nature of hardware, the effects of performing block memory copies can be reduced to an acceptable level.

Again by exploiting the parallel nature of the hardware, a copy of an individual of length l requires l+k clock cycles, where k represents the small overhead to set up the copy.

The next section describes the problems chosen to test the implementation of GP using Handel-C and the environment used for the experiments. There were four aims of running experiments.

1. To determine if a limited GP system could solve the problems chosen
2. To determine whether the system could be implemented using Handel-C and to verify that the design would fit on an FPGA
3. To obtain some indicative performance comparisons between a traditional C implementation and a hardware implementation
4. To determine whether the design was realisable as hardware and to implement the design in hardware Two problems demonstrate the general concept of GP in hardware using Handel-C. The two problems chosen were a regression problem and a boolean logic problem. The problem chosen is x=a+2b. The boolean logic problem is the 2 bit XOR function x=a⊕b.

In both problems the raw fitness was arranged to be zero for a 100% correct program, thereby reducing the amount of logic required to test for fitness.

In both problems, the run was terminated if a 100% correct program was found, or if the maximum number of generations was evaluated.

To meet the above aims the problems were run using five different environments. Firstly, as a standard C application running under Linux. This was to prove the initial program operation, and enable the application to be debugged using standard GNU tools. The program was compiled using gcc v2.95.2 and executed on a 200 MHz AMD K6 PC running Linux.

Secondly, the program was compiled using Handel-C, and optimisations made to the code to reduce logic depth, reduce gate count, and increase parallelism.

Thirdly, the Handel-C implementation was run using the Handel-C simulator. This gave the number of clock cycles needed to execute the program.

Fourthly, the C code was compiled using a cross compiler and executed on an instruction simulator for the Motorola Power-PC architecture. This was performed to get a count of instruction and memory cycles needed for a modern processor. The choice of the PowerPC for this work was made on the basis of a readily available simulator for the PowerPC. The Power-PC simulation was performed by using gcc 2.95.2 configured as a Power-PC cross compiler using the "eabi" calling convention. This version of the program was optimised so as to have a minimal start-up overhead and to not use any I/O. It is therefore as close to the FPGA program as is possible, allowing a meaningful comparison of performance to be made. The simulator itself was psim which is built into the GNU debugger (gdb). Psim can also be run as a stand-alone application.

Lastly, the output from Handel-C was used to generate a hardware layout for the place and route tools which gave the maximum clock frequency the design could be run at, and an indication of the FPGA resources required.

For the Handel-C simulation and hardware implementation, the code was compiled using Handel-C v3.0 using maximum optimisation. The final FPGA configuration data was produced using Xlinx Design Manager version 3.1i for a Xlinx Virtex XCV1000-6 chip hosted on a Celoxica RC1000 development board.

The FPGA design wrote its output to a 16 bit output port as a sequence of key, data pairs. This data was read and saved to a disk file for later analysis. A disassembler was written to decode the output data for analysis.

When measuring the clock counts of both the Handel-C simulation and the Power-PC simulation, the code was modified to run to the maximum number of generations. They also both used the same random number seed. This was done to ensure that comparisons were made using identical conditions.

Eight instructions were chosen for the regression problem, requiring three bits. Each instruction can specify up to two registers, and there are four registers available, requiring 2 bits each. Therefore each instruction requires 7 bits of storage. The instructions for this problem are:

add(Rn,Rm) adds the contents of Rm to the contents of Rn and places the result back into Rn.

sub(Rn,R m) subtracts the value in Rm from the value in Rn and places the result back to Rn.

shl(Rn) shifts the contents of Rn left by one bit, leaving the result in Rn.

shr behaves in a similar fashion, but shifting right by one bit.

nop is a no-operation function. This was included to make the number of instructions a power of 2.

halt causes the evaluation to finish, returning the value in Rn.

ldim(Rn,Kn) causes the constant Kn to be placed into Rn.

jmpifz(Rn, Rm)tests the value in Rn If the value is zero, then jumps to the location in Rm modulo program size.

Program termination occurs on the following conditions:
1. a halt instruction is encountered
2. the last instruction in the program is executed
3. a jmpifz instruction has caused a loop to be created, and a predetermined number of loops have been executed.

The machine that implements these instructions can execute one instruction every two clock cycles, including instruction fetch, decode, operand address evaluation and operand read/write. To speed this up even further it would be possible to build a pipeline, reducing the cycle count to one per instruction.

Four random constants are made available to each individual. These are created once during the construction of individuals.

Most examples of regression in the literature include the multiply and divide functions. Since these two functions generate very deep logic using the default Handel-C operators, these were replaced with single bit shift left and shift right operators, generating much shallower and therefore faster logic, and multiplying by two and dividing by two respectively.

The full set of parameters for the regression problem are given in Table 3. The input values a and b were placed in registers $R_0$ and $R_1$ before the fitness evaluation, and the result x read from register $R_0$ if the program was terminated at the end, or the value in $R_n$ if terminated by a Halt instruction. The fitness data was pre-computed once at the start of the program and made available to all copies of the fitness evaluation.

TABLE 3

Parameters for the regression problem

| Parameter | Value |
|---|---|
| Population Size | 16 |
| Functions | Add($R_n$, $R_m$), sub($R_n$, $R_m$), shl($R_n$), shr($R_n$), nop, halt($R_n$), Idim($R_n$, $K_n$), jmpifz($R_n$, $R_m$) |
| Terminals | 4 registers, $R_0 \ldots R_3$ |
| Word Size | 8 bits |
| Max Program Size | 8 |
| Generations | 511 |
| Fitness Cases | 4 pairs of values of a and b. |
| Subpopulation Size | 4 |

The XOR function uses the four basic logic primitives AND, OR, NOR and NAND. Each of these functions takes two registers, $R_n$ and $R_m$. The result is placed into $R_n$. These have been shown to be sufficient to solve the boolean XOR problem. Execution is terminated when the last instruction in the program has been executed.

The two inputs a and b were written to registers $R_0$ and $R_1$ before the fitness evaluation, and the result x read from register $R_0$ after the fitness evaluation. The full set of parameters is given in Table 4. With only four functions for this problem, each instruction requires six bits.

TABLE 4

Parameters for the XOR problem

| Parameter | Value |
|---|---|
| Population Size | 16 |
| Functions | AND($R_n$, $R_m$), OR($R_n$, $R_m$), NOR($R_n$, $R_m$), NAND($R_n$, $R_m$) |
| Terminals | 4 registers, $R_0 \ldots R_3$ |
| Word Size | 1 bit |
| Max Program Size | 16 |
| Generations | 511 |
| Fitness Cases | 4 pairs of values of a and b. |
| Subpopulation Size | 4 |
| Raw fitness | The number of fitness cases that failed to yield the expected result. |

The results from the simulator for the regression problem are given in Table 5. The figures for the PowerPC were taken from the output of running psim directly from the command line, and specifying the -Iswitch to get the total number of cpu cycles. The cycles column takes into account the pipeline stalls and branch prediction failure, but does not take into account any memory sub-system delays.

TABLE 5

Results of running the regression problem

| Measurement | Handel-C | PPC Simulation |
|---|---|---|
| cycles | 332,368 | 16,612,624 |
| Clock frequency(MHz) | 67 MHz | 200 |

TABLE 5-continued

Results of running the regression problem

| Measurement | Handel-C | PPC Simulation |
|---|---|---|
| Estimated Gates | tbd | n/a |
| Number of CLBs | tbd | n/a |
| Speedup$_{cycles}$ | 1 | 49 |
| Speedup$_{time}$ | 1 | 16.7 |

The speed-up factors are given for two conditions, the raw cycle counts and the actual time taken to execute the programs. The first is a comparison made in terms of raw clock cycles. This treats the two implementations as though they were operating at the same clock frequency. The second is a comparison made using a typical clock rate for the PPC and the fastest frequency the FPGA could be clocked as reported by the place and route tools. The speed-up factor Speedup$_{cycles}$=Cycles$_{ppc}$/Cycles$_{fpga}$ and the speed-up factor for time Speed$_{uptime}$=Speedup$_{cycles}$*Freq$_{ppc}$/Freq$_{fpga}$.

An (annotated) example program from this problem found in generation 16 of one run is:

shl($r_1$) //$r_1$=b*2
add($r_1$,$r_2$) //nop
add($r_0$,$r_1$) //$r_0$=a+(b*2)
halt($r_0$) //Return the result in $r_0$ The XOR problem was executed using the same environments as the regression problem. The results are presented in Table 6.

TABLE 6

Results of running the XOR problem

| Measurement | Handel-C | PPC Simulation |
|---|---|---|
| cycles | 814,301 | 47,885,760 |
| Clock frequency(MHz) | 67 MHz | 200 |
| Estimated Gates | Tbd | N/A |
| Number of CLBs | Tbd | N/A |
| Speedup$_{cycles}$ | 1 | 58 |
| Speedup$_{time}$ | 1 | 19.7 |

An (annotated) example program from this problem found in generation 86 of one run is:

| or($r_3$, $r_1$) | // $r_3$ = b |
| or($r_3$, r0) | // $r_3$ = a + b |
| or($r_2$, r1) | // nop |
| nand($r_0$, $r_1$) | // $r_0$ = $\overline{ab}$ |
| and($r_0$, $r_3$) | // $r_0$ = (a + b)$\overline{ab}$ |

The effect of using parallelisation was measured by implementing the XOR problem using different subpopulation sizes, and running the problem in the Handel-C simulator. A total population size of 8 was chosen, together with a maximum of 4 nodes per individual. These low numbers were chosen to allow the programs to be compiled in a reasonable amount of time. The number of subpopulations was modified each time, using the values 1, 2, 4 and 8. Data was collected for the number of cycles to perform the initial population creation, the number of cycles to evaluate the first generation, and the number of cycles to perform the breeding operators on the first generation. These are shown in tabular form in Table 7.

TABLE 7

Cycle counts and gate estimates for various stages of the GP and different subpopulation sizes.

| Sub-population size | Initial population | Evaluation of | Breeding of generation | Total cycles for run | Gate estimate |
|---|---|---|---|---|---|
| 1 | 214 | 324 | 123 | 6517 | 35,666 |
| 2 | 214 | 180 | 123 | 4669 | 43,314 |
| 4 | 214 | 108 | 123 | 3549 | 58,588 |
| 8 | 214 | 60 | 123 | 2877 | 89,136 |

FIG. 5 shows the effect on the number of cycles for one fitness evaluation with different sub population sizes. It can be seen from this graph that as the number of parallel fitness evaluations increases, so the benefit tails off. This is due to the constant overhead associated with setting up the fitness evaluations. This effect would not be so marked if the population size was greater.

The total number of cycles for the problem is shown in FIG. 6. The program was run for 16 generations. Here the effect of the breeding phase can be seen. The benefit gained from doubling the number of parallel fitness evaluations from four to eight only reduces the cycles required by 18%. The contribution of the initial population is about 7.5% of the total cycles when 8 parallel evaluations were performed.

Lastly, the effect of increasing the number of parallel fitness evaluations on the hardware resources required was measured. This is shown in FIG. 7. This shows a linear increase in the size of the hardware resources needed.

The XOR program discussed in the previous section was also run using the PPC simulator. The Handel-C version used a subpopulation size of 8. The results are shown in table 8. The maximum frequency for the FPGA was 67 MHz.

TABLE 8

Comparison of a fully parallel Handel-C program and the PPC simulator

| FPGA cycles | PPC Cycles | Speedup$_{cycles}$ | Speedup$_{time}$ |
|---|---|---|---|
| 2877 | 299,775 | 104 | 34 |

The two problems presented here, though trivial when compared to many problems that have been solved using GP, have proved the general concept of using, Handel-C to produce GP systems that can be run on FPGAs. The use of a C-like language has some valuable properties, the most important being that a GP algorithm can be developed and tested using traditional software tools. This is an important consideration for software engineering, in that there is no need to become proficient in hardware design.

The results shown above show clearly that using the current implementation, the benefits of increasing the number of parallel fitness evaluations falls off above 4. This is due to the breeding phase taking a significant portion of the cycles when compared to the fitness evaluation.

With regard to GP, the speed increase (Speeduptime ) of 19 for the XOR problem is a valuable contribution to tackling harder GP problems. As faster FPGAs become available, this factor can be exploited even further. Currently Xilinx is offering its Virtex II series that has a maximum clock rate of 450 MHz.

While the speed up in terms of clock cycles is worthwhile, it must be remembered that this work has in effect implemented traditional instructions that operate on scalar data. Greater gains can be made using an FPGA by operating on vector data, for example an image. Using vectors of data the function set can be tuned to exploit the parallelism of the hardware to a far greater extent than the problems described in this paper.

When considering problems than can expressed as boolean logic problems, the technique of sub-machine-code GP has been shown to give an improvement in performance of 2 orders of magnitude. Using an FPGA, the possible word size is only limited by available CLBs, therefore using sub-machine-code GP and very long length words opens up the possibility of even greater performance gains.

Input and output can be directly encoded into the function set, embedding the GP system and having it directly control hardware while evaluating the fitness of the programs. An example of this would be a robotic control that reads sensor inputs directly using some of the I/O pins on the FPGA and generates control signals directly to the robot. Since FPGAs do not need a lot of support circuitry such a controller could be embedded directly into even the smallest robot.

The two example problems presented so far (the regression problem and the XOR problem) represent small problems that can be solved using this system. To solve larger problems one or more of the following parameters needs to be increased:

1. the number of generations in a run
2. the size of the population
3. the number of nodes in an individual The system so far described can accommodate increases in the number of generations without any changes, but to increase the number of individuals in the population and/or the size of an individual, some changes need to be made.

There are three ways of realising random access memory in an FPGA system. Firstly, memory can be synthesised by using the single bit storage elements present in each CLB. This results in fast memory that can be accessed by parallel hardware. Secondly, some FPGAs have on-chip RAM available that can be used by a Handel-C program. This results in fast memory, but can only be accessed once per clock cycle thereby limiting its usefulness when accessing memory in parallel machines. Lastly, external off-chip RAM can be interfaced to the FPGA using some of the input/output pins available. This gives access to potentially many Gbytes of RAM, but at the expense of access speed.

Extending the system to handle larger population sizes and larger individuals requires that the population is divided into an active sub-population that is held in fast synthesised memory and an inactive sub-population that is held in the slower on-chip RAM or off-chip RAM. Individuals are moved between the slow inactive sub-population and the fast active sub-population. By arranging the movement of individuals to be performed in parallel with the main evaluation and breeding phases, the delay imposed by accessing the slow inactive sub-population can be minimised.

The invention claimed is:

1. An uncommitted configurable hardware logic device adapted, when configured, to implement a complete evolutionary algorithm in hardware, the configured hardware logic device comprising:
   a) population producing means having an output, and operative for producing an initial population of individuals at the output;
   b) fitness evaluating means having an input and first and second outputs, the output of the population producing means being connected to the input of the fitness evaluating means, and the fitness evaluating means being operative for carrying out fitness tests on the initial population of individuals, and for providing results of the fitness tests and the respective individuals at the first output of the fitness evaluating means;

c) selector means having an input and an output, and operative for selecting at least one individual of the initial population on the basis of the results of the fitness tests and the respective individuals connected from the output of the fitness evaluating means to the input of the selector means, and for providing the selected at least one individual at the output of the selector means;

d) breeding means having an input connected to the output of the selector means, and operative for breeding a further population of individuals from the selected at least one individual, and having an output connecting the further population of individuals to the input of the fitness evaluating means; and e) the fitness evaluating means being further operative for providing a single preferred selected individual from the further population of individuals at the second output of the fitness evaluating means.

2. The uncommitted configurable hardware logic device when configured as claimed in claim 1, wherein the evolutionary algorithm is genetic programming.

3. The uncommitted configurable hardware logic device when configured as claimed in claim 1, wherein the uncommitted configurable hardware logic device is a field programmable gate array (FPGA).

4. The uncommitted configurable hardware logic device when configured as claimed in claim 1, which is configured to perform a selected step or steps each in a plurality of parallel steps.

5. The uncommitted configurable hardware logic device when configured as claimed in claim 1, wherein a configuration is by means of a high-level language to hardware compilation system.

6. The uncommitted configurable hardware logic device when configured as claimed in claim 5, wherein the high-level language to hardware compilation system is Handel-C.

7. The uncommitted configurable hardware logic device when configured as claimed in claim 1, wherein the uncommitted configurable hardware logic device is reconfigurable.

8. The uncommitted configurable hardware logic device when configured as claimed in claim 1, and a random access memory included or connected to the device.

9. The uncommitted configurable hardware logic device when configured as claimed in claim 1, and a random number generator configured from a part of the device.

10. The uncommitted configurable hardware logic device when configured as claimed in claim 1, when configured to operate on scalar data.

11. The uncommitted configurable hardware logic device when configured as claimed in claim 1, when configured to operate on vector data.

12. The uncommitted configurable hardware logic device when configured as claimed in claim 1, when configured to operate on sub-machine-code.

13. A method of implementing a complete evolutionary algorithm in hardware by configuring an uncommitted configurable hardware logic device to carry out the steps of:

a) creating an initial population of individuals;

b) evaluating a fitness of the initial population of individuals;

c) selecting at least one fittest individual from the initial population of individuals based on the evaluating of the fitness of the initial population of individuals;

d) breeding a further population of individuals from the selected at least one fittest individual;

e) evaluating a fitness of the further population of individuals; and f) selecting a preferred one of the further population of individuals based on the evaluating of the fitness of the further population of individuals.

14. The method of claim 13, wherein the evolutionary algorithm is genetic programming.

15. The method of claim 13, wherein the uncommitted hardware logic device is a field programmable gate array (FPGA).

16. The method of claim 13, wherein at least one of the steps is performed in a plurality of parallel steps.

17. The method of claim 13, wherein the configuring is performed by a high-level language to hardware compilation system.

18. The method of claim 17, wherein the high-level language to hardware compilation system is Handel-C.

19. The method of claim 13, wherein the uncommitted configurable hardware logic device is reconfigurable.

20. The method of claim 13, and the step of storing data in a random access memory.

21. The method of claim 13, and the step of configuring a random number generator.

22. The method of claim 13, and the step of operating on scalar data.

23. The method of claim 13, and the step of operating on vector data.

24. The method of claim 13, and the step of operating on sub-machine code.

* * * * *

UNITED STATES PATENT AND TRADEMARK OFFICE
CERTIFICATE OF CORRECTION

PATENT NO. : 7,222,323 B2
APPLICATION NO. : 10/469808
DATED : May 22, 2007
INVENTOR(S) : Martin It is certified that error appears in the above-identified patent and that said Letters Patent is hereby corrected as shown below:

On the Title Page, item (56), under "OTHER PUBLICATIONS", in Column 2, Line 1, delete "Hardward" and insert -- Hardware --, therefor.

On the Title Page, item (56), under "OTHER PUBLICATIONS", in Column 2, Line 3, delete "Reliabilty," and insert -- Reliability, --, therefor.

On Page 2, item (56), under "OTHER PUBLICATIONS", in Column 1, Line 7, delete "Immplementation" and insert -- Implementation --, therefor.

On Page 2, item (56), under "OTHER PUBLICATIONS", in Column 1, Line 7, delete "Thomsom," and insert -- Thomson, --, therefor.

On Page 2, item (56), under "OTHER PUBLICATIONS", in Column 1, Line 8, delete "Colliquium" and insert -- Colloquium --, therefor.

On Page 2, item (56), under "OTHER PUBLICATIONS", in Column 2, Line 2, delete "Stevengage," and insert -- Stevenage, --, therefor.

On Page 2, item (56), under "OTHER PUBLICATIONS", in Column 2, Line 5, after "IEEE" delete "1998".

In Column 1, Line 46, delete "Xlinx" and insert -- Xilinx --, therefor.

In Column 3, Line 4, delete "Xlinx" and insert -- Xilinx --, therefor.

In Column 4, Line 43, delete "comprising;" and insert -- comprising: --, therefor.

In Column 5, Line 8, delete "of;" and insert -- of: --, therefor.

In Column 5, Line 24, delete "FGPA;" and insert -- FPGA; --, therefor.

In Column 8, Line 11, delete "Xlinx" and insert -- Xilinx --, therefor.

In Column 8, Line 12, delete "Xlinx" and insert -- Xilinx --, therefor.

In Column 8, Line 29, delete "Rn" and insert -- $R_n$ --, therefor at each occurrence throughout the specification.

UNITED STATES PATENT AND TRADEMARK OFFICE
CERTIFICATE OF CORRECTION

PATENT NO. : 7,222,323 B2
APPLICATION NO. : 10/469808
DATED : May 22, 2007
INVENTOR(S) : Martin It is certified that error appears in the above-identified patent and that said Letters Patent is hereby corrected as shown below:

In Column 8, Line 29, delete "Rm" and insert -- $R_m$ --, therefor at each occurrence throughout the specification.

In Column 8, Line 41, delete "Kn" and insert -- $K_n$ --, therefor at each occurrence throughout the specification.

In Column 10, Line 52, delete "or(r3, r0)" and insert -- or($r_3$, $r_0$) --, therefor.

In Column 10, Line 52, delete "r3" and insert -- $r_3$ --, therefor.

In Column 10, Line 53, delete "or(r2, r1)" and insert -- or($r_2$, $r_1$) --, therefor.

In Column 11, Line 50, delete "using," and insert -- using --, therefor.

Signed and Sealed this

Thirteenth Day of January, 2009

JON W. DUDAS
*Director of the United States Patent and Trademark Office*